L. W. GALLOWAY.
PNEUMATIC TIRE ARMOR.
APPLICATION FILED FEB. 11, 1907.

938,311.

Patented Oct. 26, 1909.

Witnesses
I. Milton Jester
C. H. Griesbauer

Inventor
L. W. Galloway
by H. B. Willson & Co
Attorneys

UNITED STATES PATENT OFFICE.

LEE W. GALLOWAY, OF NORWOOD, COLORADO.

PNEUMATIC-TIRE ARMOR.

938,311.	Specification of Letters Patent.	Patented Oct. 26, 1909.

Application filed February 11, 1907. Serial No. 356,903.

*To all whom it may concern:*

Be it known that I, LEE W. GALLOWAY, a citizen of the United States, residing at Norwood, in the county of San Miguel and State of Colorado, have invented certain new and useful Improvements in Pneumatic-Tire Armors; and I do declare the following to be a full, clear, and exact description of the invention, such as will enable others skilled in the art to which it appertains to make and use the same.

My invention has relation to pneumatic tire armors, and it consists in the construction and arrangement of parts, as will be hereinafter described and particularly pointed out in the claim.

Figure 1:
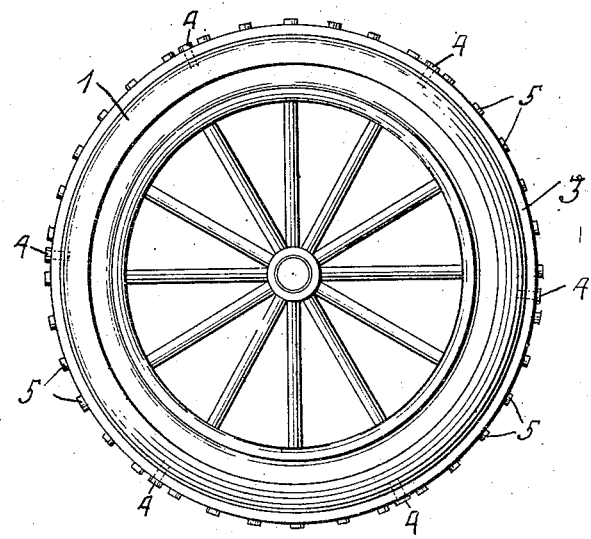
Figure 2:
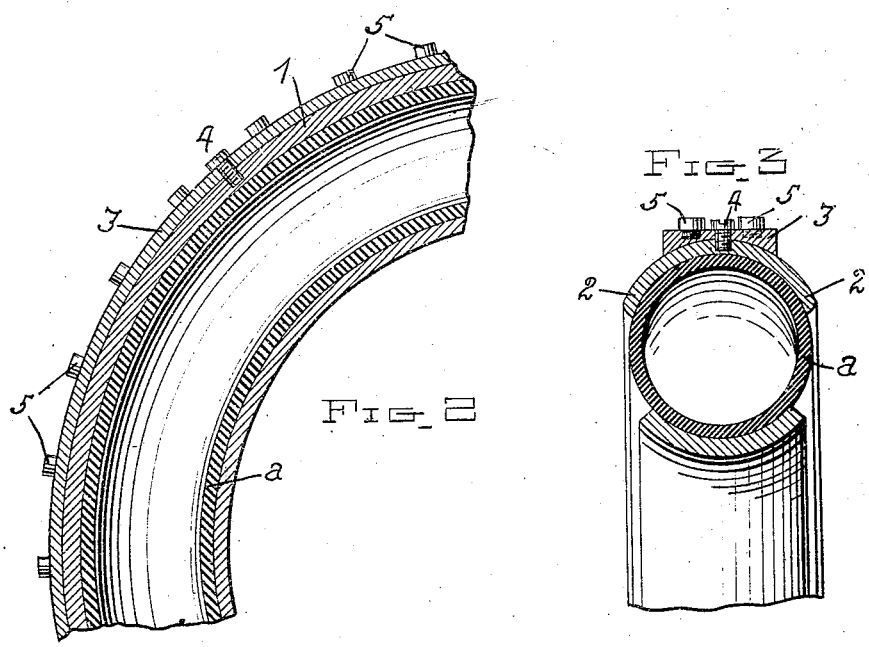
Figure 3:
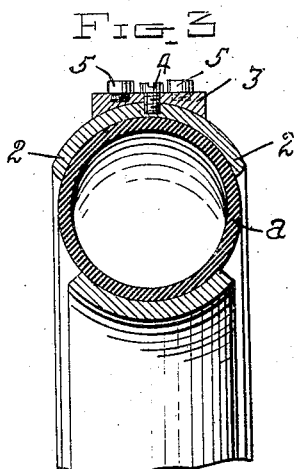

In the accompanying drawings, Figure 1 is an elevation of a tire armor embodying my invention, showing the same on the pneumatic tire of a wheel; Fig. 2 is a detail longitudinal sectional view of the same on a larger scale; and Fig. 3 is a detail transverse sectional view of the same.

The shield 1 is made of suitable metal, is annular in form to extend around the pneumatic tire *a* and is here shown as concavo-convex is cross section to adapt the same to fit snugly on the pneumatic tire. In practice, the interior diameter of the shield is somewhat less than the normal exterior diameter of the pneumatic tire so that when fitting the shield on the tire, the latter becomes compressed and the expansive action of the tire serves to cause the shield to be firmly retained thereon. It will be observed by reference to Fig. 3 that the edges 2 of the shield are spaced somewhat from the rim of the wheel, that is to say, the sides of the said shield extend only partially over the sides of the pneumatic tire and hence a space is left between the edges of the said shield and the rim for the action of the tire, as will be understood. On the tread portion or periphery of the shield is the tread ring 3 which is here shown as flat and which fits snugly around the shield 1. The width of the tread ring is considerably less than that of the shield so that the said tread ring keeps the shield ordinarily from coming into contact with the road surface and hence preserves the shield from wear. The said tread ring also reinforces the shield and serves to greatly strengthen the same. The tread ring is detachably secured on the shield by any suitable means. I here show screws 4 for this purpose which are placed at suitable distances apart and engage coincident threaded openings in the tread ring and in the shield. I also provide the tread ring with peripheral radially projecting studs 5 which are disposed in staggered relation and by engagement with the road surface add greatly to the tractive power of the wheel and prevent the wheel from slipping. The said studs are here shown as having screw shanks which engage the threaded openings in the tread ring and as having heads which bear on the periphery of the tread rings. Hence, said studs are removable and can be renewed when they become worn. When the tread ring becomes worn, it can be removed and replaced by another so that the life of the annular shield 1 may be indefinitely prolonged.

From the foregoing description, taken in connection with the accompanying drawings, the construction and operation of the invention will be readily understood without requiring a more extended explanation.

Having thus described my invention, what I claim as new is,—

A pneumatic tire armor comprising an integral annular shield adapted to fit over the tread portion of the tire of the wheel, a steel ring having a concave inner surface which contacts solely with the central or tread portion of said shield, a plurality of fastening screws passing through the ring and taking into threaded sockets formed in the shield to detachably secure the two together, the upper and side surfaces of the ring being continuously flat, and screw studs disposed in staggered relation to increase the traction power of the wheel and projecting above the means for securing the ring to the shield, substantially as specified.

In testimony whereof I have hereunto set my hand in presence of two subscribing witnesses.

LEE W. GALLOWAY.

Witnesses:
J. W. GARNER,
S. C. HILL.